US009338440B2

(12) United States Patent
Li et al.

(10) Patent No.: US 9,338,440 B2
(45) Date of Patent: May 10, 2016

(54) USER INTERFACE FOR THREE-DIMENSIONAL MODELING

(71) Applicant: MICROSOFT TECHNOLOGY LICENSING, LLC, Redmond, WA (US)

(72) Inventors: Zhiwei Li, Beijing (CN); Rui Cai, Beijing (CN); Jiawei Gu, Shanghai (CN); Lei Zhang, Beijing (CN); Yong Rui, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 204 days.

(21) Appl. No.: 13/919,933

(22) Filed: Jun. 17, 2013

(65) Prior Publication Data

US 2014/0368620 A1 Dec. 18, 2014

(51) Int. Cl.
*G06T 19/00* (2011.01)
*H04N 5/232* (2006.01)
*H04N 13/02* (2006.01)
*G06F 3/00* (2006.01)

(52) U.S. Cl.
CPC .............. *H04N 13/0282* (2013.01); *G06F 3/00* (2013.01); *G06T 19/006* (2013.01); *H04N 5/23216* (2013.01); *H04N 5/23293* (2013.01); *H04N 13/0221* (2013.01); *H04N 13/0296* (2013.01)

(58) Field of Classification Search
CPC ..... G06F 3/00; G06T 19/006; H04N 5/23293
See application file for complete search history.

(56) References Cited

U.S. PATENT DOCUMENTS

| 2005/0031194 A1* | 2/2005 | Lee et al. ........................ 382/154 |
| 2008/0152192 A1 | 6/2008 | Zhu et al. |
| 2009/0003687 A1 | 1/2009 | Agarwal et al. |
| 2009/0304280 A1 | 12/2009 | Aharoni et al. |
| 2009/0310851 A1 | 12/2009 | Arcas et al. |
| 2010/0066810 A1* | 3/2010 | Ryu et al. .......................... 348/36 |
| 2011/0242283 A1 | 10/2011 | Tyagi et al. |
| 2011/0262031 A1 | 10/2011 | Zhou et al. |
| 2012/0214590 A1* | 8/2012 | Newhouse et al. .............. 463/31 |
| 2012/0293549 A1* | 11/2012 | Osako ................ H04N 13/0275 345/633 |
| 2013/0314401 A1* | 11/2013 | Engle et al. .................... 345/419 |

OTHER PUBLICATIONS

Makadia, Spherical Correlation of Visual Representations for 3D Model Retrieval, Int J Comput Vis (2010) 89: 193-210.*
Alahari, et al., "Reduce, Reuse & Recycle: Efficiently Solving Multi-Label MRFs", Retrieved at <<http://ieeexplore.ieee.org/stamp/stamp.jsp?tp=&arnumber=4587402>>, In Proceeding of IEEE Conference on Computer Vision and Pattern Recognition, Jun. 23, 2008, pp. 8.

(Continued)

*Primary Examiner* — Ming Hon
*Assistant Examiner* — Phuc Doan
(74) *Attorney, Agent, or Firm* — Sandy Swain; Micky Minhas

(57) ABSTRACT

A method of acquiring a set of images useable to 3D model a physical object includes imaging the physical object with a camera, and displaying with the camera a current view of the physical object as imaged by the camera from a current perspective. The method further includes displaying with the camera a visual cue overlaying the current view and indicating perspectives from which the physical object is to be imaged to acquire the set of images.

19 Claims, 11 Drawing Sheets

(56) References Cited

OTHER PUBLICATIONS

Bai, et al., "Video SnapCut: Robust Video Object Cutout Using Localized Classifiers", Retrieved at <<http://yuwing.kaist.ac.kr/courses/CS770../reading/VideoSnapCut.pdf>>, In Journal of ACM Transactions on Graphics, vol. 28, Issue 3, Aug. 2009, pp. 11.
Bleyer, et al., "Object Stereo—Joint Stereo Matching and Object Segmentation", Retrieved at <<http://ieeexplore.ieee.org/stamp/stamp.jsp?tp=&arnumber=5995581>>, In Proceedings of the IEEE Conference on Computer Vision and Pattern, Jun. 20, 2011, pp. 8.
Campbell, et al., "Automatic Object Segmentation from Calibrated Images", Retrieved at <<http://ieeexplore.ieee.org/stamp/stamp.jsp?tp=&arnumber=6103284>>, In Proceeding of the Conference for Visual Media Production, Nov. 16, 2011, pp. 12.
Campbell, et al., "Automatic 3D Object Segmentation in Multiple Views using Volumetric Graph-Cuts", Retrieved at <<http://george-vogiatzis.org/publications/bmvc07_automatic_segmentation.pdf>>, In Journal of Image and Vision Computing, vol. 28, Issue 1, Jan. 2010, pp. 10.
Chambolle, et al., "A First-Order Primal-Dual Algorithm for Convex Problems with Applications to Imaging", Retrieved at <<http://posgrado.escom.ipn.mx/biblioteca/A%20First-Order%20Primal-Dual%20Algorithm%20for%20Convex%20Problems.pdf>>, In Journal of Mathematical Imaging and Vision, vol. 40, No. 1, Dec. 21, 2010, pp. 26.
Cremers, et al., "Multiview Stereo and Silhouette Consistency via Convex Functionals over Convex Domains", Retrieved at <<http://vision.in.tum.de/_media/spezial/bib/cremers_kolev_pami11.pdf>>, In Journal of IEEE Transactions on Pattern Analysis and Machine Intelligence, vol. 33, Issue 6, Jun. 2011, pp. 14.
Fan, et al., "LIBLINEAR: A Library for Large Linear Classification", Retrieved at <<http://www.gise.cse.iitb.ac.in/wiki/images/f/f1/Liblinear.pdf>>, In Journal of Machine Learning Research, vol. 9, Aug. 2008, pp. 21.
Kolev, et al., "Fast Joint Estimation of Silhouettes and Dense 3D Geometry from Multiple Images", Retrieved at <<http://lmbinformatik.uni-freiburg.de/Publications/2012/Bro12/kolev_tpami11.pdf>>, In Journal of EEE Transactions on Pattern Analysis and Machine Intelligence, vol. 34, Issue 3, Mar. 2012, pp. 13.
Kolmogorov, et al., "What Energy Functions Can Be Minimized Via Graph Cuts?", Retrieved at <<http://www.cs.cornell.edu/~rdz/papers/kz-pami04.pdf>>, In Journal of EEE Transactions on Pattern Analysis and Machine Intelligence, vol. 26, Issue 2, Feb. 2004, pp. 13.
Kowdle, et al., "Multiple View Object Cosegmentation using Appearance and Stereo Cues", Retrieved at <<http://research.microsoft.com/en-us/um/redmond/groups/IVM/MVSeg/pdf/kowdleECCV12.pdf>>, In Proceedings of the 12th European Conference on Computer Vision—vol. Part V, Oct. 2012, pp. 14.
Laurentini, Aldo, "The Visual Hull Concept for Silhouette-Based Image Understanding", Retrieved at <<http://ieeexplore.ieee.org/stamp/stamp.jsp?tp=&arnumber=273735>>, In Journal of IEEE Transactions on Pattern Analysis and Machine Intelligence, vol. 16, Issue 2, Feb. 1994, pp. 13.
Lee, et al., "Silhouette Segmentation in Multiple Views", Retrieved at <<http://ieeexplore.ieee.org/stamp/stamp.jsp?tp=&arnumber=5639011>>, In Journal of IEEE Transactions on Pattern Analysis and Machine Intelligence, vol. 33, Issue 7, Jul. 2011, pp. 13.
Lhuillier, et al., "A Quasi-Dense Approach to Surface Reconstruction from Uncalibrated Images", Retrieved at <<http://ieeexplore.ieee.org/stamp/stamp.jsp?tp=&arnumber=1388267>>, In Journal of IEEE Transactions on Pattern Analysis and Machine Intelligence, vol. 27, Issue 3, Mar. 2005, pp. 16.
Liu, et al., "Paint Selection", Retrieved at <<http://research.microsoft.com/en-us/um/people/jiansun/papers/PaintSelection_SIGGRAPH09.pdf>>, In Journal of ACM Transaction Graph, vol. 28, No. 3, Aug. 2009, pp. 7.
Matusik, et al., "Image-Based Visual Hulls", Retrieved at <<http://www.cs.northwestern.edu/~jet/Teach/2004_1winAdvGraphics/Papers/matusik00IBVH.pdf>>, In Proceedings of the 27th Annual Conference on Computer Graphics and Interactive Techniques, Jul. 23, 2000, pp. 6.
Quan, et al., "Image-Based Modeling by Joint Segmentation", Retrieved at <<http://research.microsoft.com/en-us/um/people/luyuan/paper/JointSegment_IJCV07.pdf>>, In Journal of International Journal of Computer Vision, vol. 75, Issue 1, Oct. 2007, pp. 16.
Reinbacher, et al., "Variational Segmentation of Elongated Volumetric Structures", Retrieved at <<http://ieeexplore.ieee.org/stamp/stamp.jsp?tp=&arnumber=5539771>>, In Proceeding of IEEE Conference on Computer Vision and Pattern Recognition, Jun. 13, 2010, pp. 8.
Rother, et al., ""GrabCut"—Interactive Foreground Extraction using Iterated Graph Cuts", Retrieved at <<http://yuwing.kaist.ac.kr/courses/cs770/reading/grabcut.pdf>>, In Journal of ACM Transactions on Graphics, vol. 23, Issue 3, Aug. 2004, pp. 6.
Seitz, et al., "A Comparison and Evaluation of Multi-View Stereo Reconstruction Algorithms", Retrieved at <<http://ieeexplore.ieee.org/stamp/stamp.jsp?tp=&arnumber=1640800>>, In Proceedings of the IEEE Computer Society Conference on Computer Vision and Pattern Recognition, vol. 1, Jun. 17, 2006, pp. 8.
Vogiatzis, et al., "Automatic Camera Pose Estimation From Dot Pattern", Retrieved at <<http://george-vogiatzis.org/calib/>>, Retrieved Date: Mar. 7, 2013, pp. 4.
Wu, et al., "Multicore Bundle Adjustment", Retrieved at <<http://ieeexplore.ieee.org/stamp/stamp.jsp?tp=&arnumber=5995552>>, In Proceedings of the IEEE Conference on Computer Vision and Pattern Recognition, Jun. 20, 2011 pp. 8.
Law, et al., "A Semisupervised Segmentation Model for Collections of Images", Retrieved at <<http://ieeexplore.ieee.org/stamp/stamp.jsp?tp=&arnumber=6151828>>, In IEEE Transactions on Image Processing, vol. 21, Issue 6, Jun. 2012, pp. 14.
Klehm, et al., "Interactive Geometry-Aware Segmentation for the Decomposition of Kaleidoscopic Images", Retrieved at <<http://people.mmci.uni-saarland.de/~ihrke/Publications/vmv12.pdf>>, In 17th International Workshop on Vision, Modeling and Visualization, Nov. 12, 2012, pp. 7.

\* cited by examiner

USER INTERFACE FOR THREE-DIMENSIONAL MODELING

BACKGROUND

Consumer devices including digital cameras typically capture two-dimensional images of physical objects. Multiple two-dimensional pictures may be used to generate a three-dimensional model of the physical object. The quality of a three-dimensional model may depend upon the number of perspectives imaged and the quality of images at each perspective, which may not be identified until a user views the images and/or the three-dimensional model.

SUMMARY

Embodiments are disclosed herein for acquiring a set of images useable to 3D model a physical object. For example, a method of acquiring a set of images may include imaging the physical object with a camera and displaying with the camera a current view of the physical object as imaged by the camera from a current perspective. In order to assist a user in completing the set of images for the 3D model, the method may include displaying, with the camera, a visual cue overlaying the current view and indicating perspectives from which the physical object is to be imaged to acquire the set of images.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As described above, a 3D model of a physical object may be generated from a set of 2D images when the set of 2D images collectively image the physical object from a sufficient number of different perspectives. However, a user acquiring the set of 2D images may not be provided with any hint as to the amount of surfaces and/or perspectives of the object left uncaptured until a 3D model is generated or the set of 2D images are manually examined. Further, the user may not be able to identify the quality of each individual perspective of the object that is captured. Without knowledge of perspectives captured in lower quality than others, the user may take a trial-and-error approach by needlessly recapturing images at multiple perspectives in order to increase an overall quality of a 3D model.

Furthermore, the absence of a hint or guide while acquiring the set of 2D images may cause the user to over-image different perspectives haphazardly, thereby acquiring images that may cover multiple perspectives redundantly. Such acquisition may be less efficient than scenarios in which a user captures images by following a path around an object that minimizes unnecessary perspective overlap.

The present disclosure provides methods and systems for acquiring a set of images for 3D modeling. A visual cue guides a user through the acquisition. The visual cue may overlay the physical object as displayed on an imaging device and identify multiple perspectives from which an object is to be imaged to provide a set of 2D images useable for generating a 3D model of the object. Further, the appearance of the visual cue may be altered to provide an indication of the capture state of each perspective dynamically as the user images the object with the imaging device. Thus, the user may be guided by the visual cue to capture each perspective of the object in an efficient manner without resorting to a trial-and-error and/or over-imaging approach.

Figure 1:
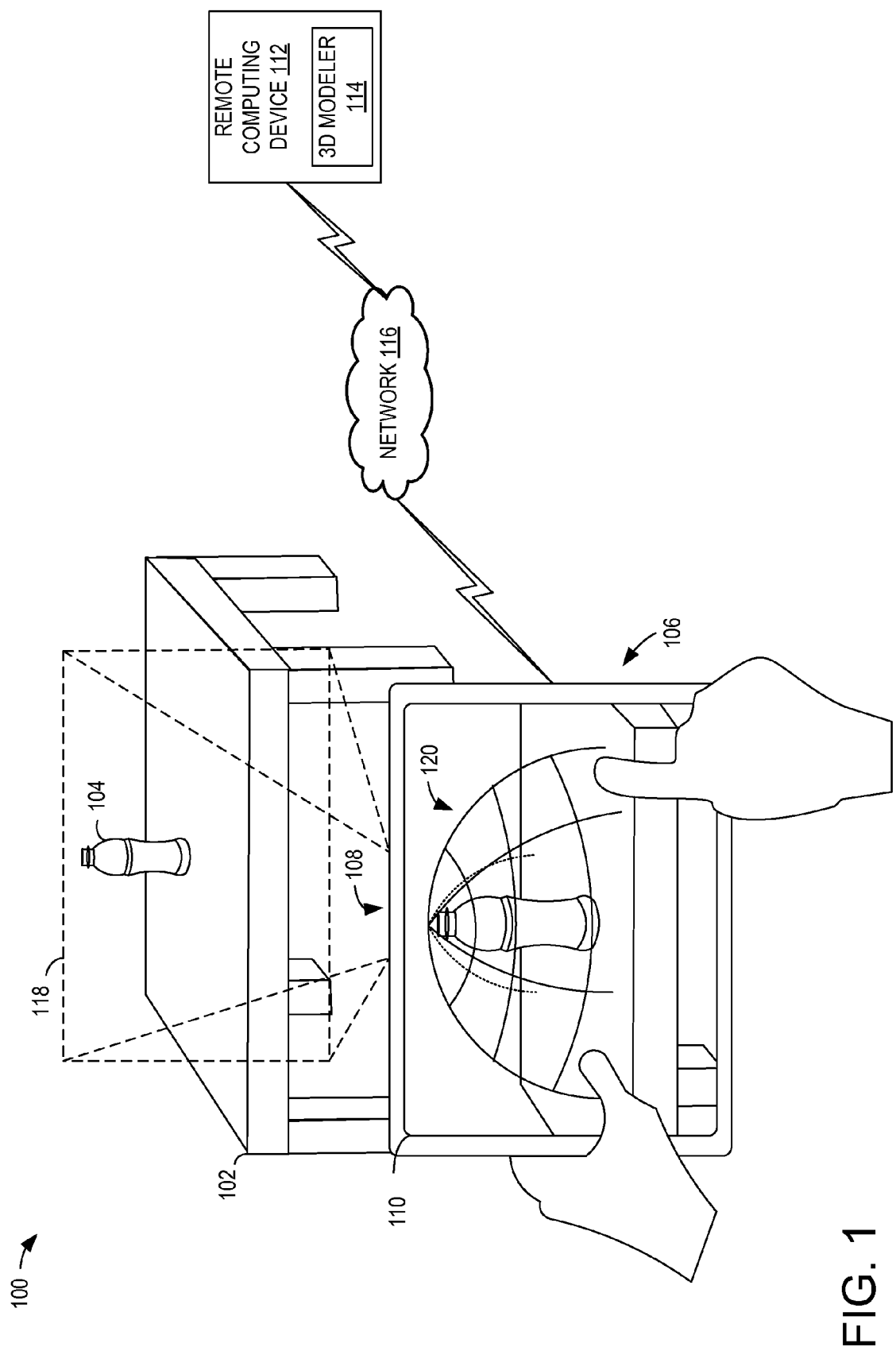
FIG. 1 shows an example environment for 3D modeling a physical object in accordance with an embodiment of the present disclosure.

FIG. 1 shows an example environment 100 for performing a 3D modeling and/or reconstruction of a physical object. The environment 100 may include one or more physical objects, including a background object 102 and a targeted object 104. Background objects, such as the table illustrated in FIG. 1, may include physical objects that are not targeted for 3D modeling. Targeted objects, such as the bottle illustrated in FIG. 1, may include one or more objects that are to be imaged in order to generate a 3D model of the object(s). Although the present example focuses on the acquisition of images relating to a single targeted object, it is to be understood that multiple targeted objects may be imaged simultaneously or sequentially to generate one or more 3D models of the multiple targeted objects.

In order to generate a 3D model of the targeted object 104, a user may image multiple perspectives of the targeted object 104 with a camera 106. The camera 106 may include an imaging device 108 for capturing the images of the targeted object 104 and a display 110 for displaying information relating to the image capturing. The camera 106 may take the form of any suitable device for imaging a targeted object, including but not limited to a tablet computer, a smart phone, a mobile computing device, a laptop computer, a head-mounted display device, a home entertainment system peripheral, a desktop computer peripheral, a watch, a point-and-shoot camera, etc.

The camera 106 may also include a communications subsystem for communicating with a remote computing device 112. For example, the remote computing device 112 may include a 3D modeler 114 that is configured to generate a 3D model of a physical object using a set of images covering different perspectives of the physical object. The camera 106 may send at least a portion of the set of images to the 3D modeler 114 via network 116 and/or receive a 3D model of the object based on the portion of the set of images. The 3D modeler 114 may identify the relationship of each image to a given perspective of the physical object based on any suitable information. For example, the user, camera 106, and/or metadata for each image may provide information relating to the physical object, the relative and/or absolute perspective of a given image, and/or other information for generating the 3D model of the physical object. Further, the 3D modeler may include algorithms for determining at least some of the information for generating the 3D model of the physical object. For example, the 3D modeler may identify edges in the images to determine relative positioning of the images to one another and/or locate the physical object within the images. The camera 106 may be configured to display an indicator (e.g., progress bar) indicating a status of the remote computing device events, such as a status of generating 3D model.

In some embodiments, the 3D modeler may be part of the camera. For example, the 3D modeler may include hardware, firmware, and/or software components that are native to the camera.

The imaging device 108 of the camera 106 may be configured to capture 2D images and/or videos within a field of view 118 to build the set of 2D images. For example, a user may move the camera 106 around the targeted object 104 while recording a video in order to capture image data relating to multiple perspectives of the targeted object 104. The field of view 118 of the imaging device may be displayed on display 110 as a current view in order to assist the user in identifying a portion of the environment and/or object that may be imaged by the imaging device from a current perspective. For example, the current perspective illustrated in FIG. 1 may correspond to a particular side and/or front view of the targeted object 104. The field of view 118 may be displayed with one or more user interface elements for controlling operation of the camera 106 and/or imaging device.

A visual cue 120 may be displayed on the display 110 in order to guide the user through capturing each perspective of the targeted object 104. The visual cue 120 may indicate one or more perspectives of the targeted object 104 to assist the user in selecting a position and/or orientation of the camera 106 for capturing multiple 2D images and/or a video stream of the targeted object 104. The set of images for building a 3D model of the targeted object 104 may comprise at least one image that is captured at each of the perspectives indicated by the visual cue 120. As illustrated in FIG. 1, the visual cue 120 may be displayed as an overlay of the current view of the targeted object as imaged by the imaging device of the camera 106. The visual cue 120 may have any suitable configuration for guiding a user through imaging the targeted object 104 to acquire the set of 2D images. Embodiments relating to different configurations of the visual cue are described below with regards to FIGS. 2-7. Further, the camera 106 may include a speaker and/or other suitable audio output device for outputting audio data relating to provide audio feedback responsive to capturing an image at a perspective and/or moving the camera 106 such that a current perspective matches an uncaptured perspective.

The visual cue 120 may be generated locally or at the remote computing device 112 based on one or more images of the targeted object 104. For example, the remote computing device 112 may send information for displaying the visual cue 120 responsive to receiving one or more images from the set of images and/or one or more initializing images. The information may include a type of visual cue, size, position, number of perspectives represented by the visual cue, and/or any other suitable information relating to the configuration of the visual cue. For example, the number of perspectives represented by the visual cue may correspond to the minimum number of perspectives that may be used to generate a 3D model at a threshold level of accuracy, which in turn may correspond to the number of images in the set of 2D images to be imaged. The threshold level of accuracy may provide a predefined and/or user-defined indication of an acceptable resolution, level of detail, and/or other parameter of quality associated with the 3D model. In some embodiments, the information relating the configuration and/or placement of the visual cue may be generated based upon one or more sensors of the camera 106. For example, a visual cue may be oriented on a screen based upon a gyroscope output of the camera 106. Further, the visual cue may be manipulated by user input to ensure alignment to a targeted object. For example, after displaying the visual cue, the camera 106 may receive user input that resizes the visual cue and positions the visual cue such that the targeted object is centered and surrounded by the visual cue.

Figure 2:
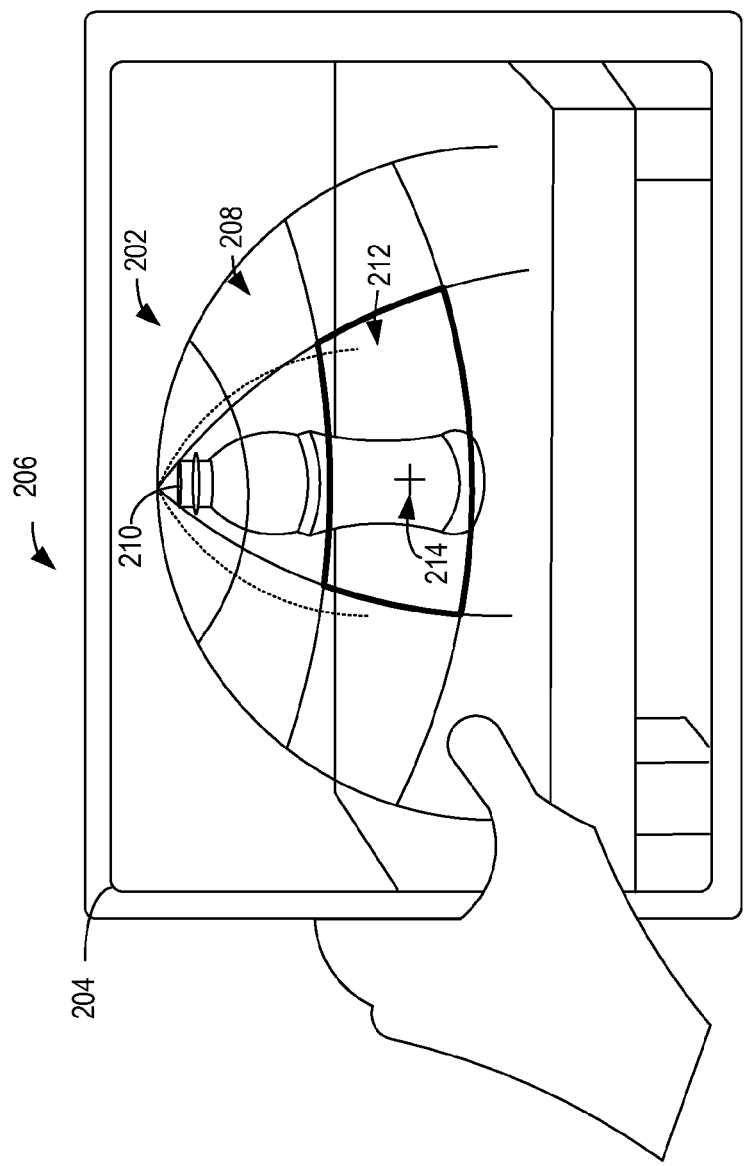
FIGS. 2-4 show example visual cues for acquiring a set of images for 3D modeling a physical object in accordance with an embodiment of the present disclosure.

FIG. 2 shows an example embodiment of a visual cue 202 as displayed on a display 204 of a camera 206 for assisting a user in acquiring a set of images for 3D modeling of a physical object. For example, the camera 206 may correspond to the camera 106 of FIG. 1 and may be imaging the targeted object 104 at the perspective illustrated in FIG. 1. The camera 206 may be used to image the physical object represented on the display 204 in a current view. The visual cue 202 includes cells 208 spherically arranged to form a grid surrounding a representation 210 of the physical object as displayed on a display 204, each cell indicating a perspective from which the physical object is to be imaged to acquire a set of images. For example, each cell may appear to be positioned in a location that hovers in front of a different surface and/or perspective face of the physical object. Thus, the perspective indicated by a particular cell is a perspective in which an optical axis of the camera is substantially perpendicular to the cell and passes through the cell.

The spherical arrangement of the cells 208 enables a user to identify a relationship between a location of a particular cell, a perspective of the physical object associated with the particular cell, and a current view through an imaging device of the camera 206. For example, a cell located toward the top of a sphere that appears to taper toward a top of a representation of a physical object may be identified as corresponding to a top perspective of the object as viewed from above the object. Likewise, a cell that appears in or near the center of a display with low levels of tapering relative to other cells may be identified as corresponding to a perspective of the object at or near the current view. Although illustrated as a hemisphere in FIG. 2, it is to be understood that the cells 208 may be spherically-arranged in any configuration to form a full sphere or any suitable portion of a sphere around one or more targeted physical objects.

The appearance of the visual cue 202 may be altered during movement of the camera 206 and/or while capturing images of the physical object. As illustrated in FIG. 2, a current cell 212 has an altered appearance relative to other cells of the visual cue 202 to indicate that it corresponds to a current view of the object. The altered appearance of the cell may be a targeted styling to indicate that a current view is matched to a perspective associated with the cell. For example, the targeted styling may include displaying an outline around the current cell 212 to distinguish the boundaries of the current cell 212 from other cells 208. In other examples, the current cell 212 may be displayed with a predetermined and/or altered color, shape, pattern, size, line weight, highlight, animation, opacity level, and/or other suitable styling to indicate that the current cell is able to be imaged at the current perspective indicated by the current view. The current cell may also have multiple appearances to differentiate between current perspectives that may image a portion of the cell and those that may image the entirety of the cell. Further, a displayable aimer 214 may be presented on the display to aid the user in aiming the camera 206 toward a particular cell and/or perspective of the physical object. For example, the aimer 214 may be a cursor, crosshairs, icon, and/or other displayable image aligned to the center of the current view, the center of the visual cue, and/or any other suitable location to assist the user in aiming the camera toward the physical object. Accordingly, an appearance of a cell may be altered to indicate a current cell responsive to the aimer 214 reaching a location within the cell. For example, the location within the cell may be a location adjacent to an edge of the cell or a location within a predefined distance from one or more edges of the cell.

Figure 3:
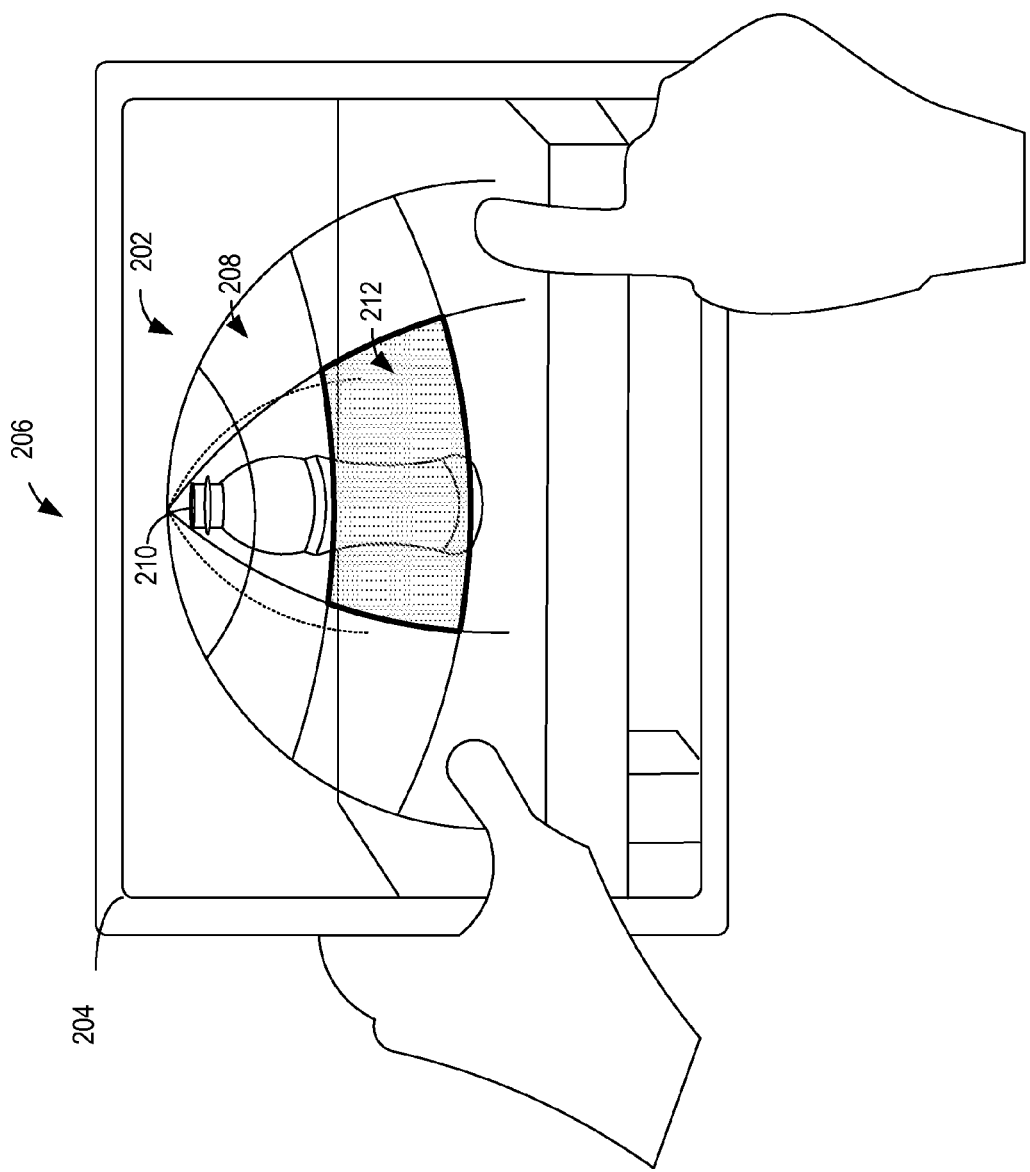

FIG. 3 illustrates the visual cue 202 as displayed on display 204 of the camera 206 responsive to capturing a useable image at the current perspective. In particular, the appearance of the current cell 212 of the visual cue 202 is shown as being altered from the targeted styling illustrated in FIG. 2 to a captured styling responsive to capturing the image at the current perspective. The captured styling may include displaying the cell with a predetermined and/or altered color, shape, pattern, size, line weight, highlight, animation, opacity level, and/or other suitable styling that is different from the captured styling to indicate that the cell has been imaged at the perspective associated with the cell. The captured styling of the current cell 212 may retain one or more features of the targeted styling as long as the camera 206 remains aimed at the current cell 212. While one or more features of the targeted styling may be removed responsive to moving the camera from the perspective associated with the current cell 212, the captured styling may remain until all perspectives of the physical object are captured, the visual cue 202 is reset, the 3D model of the physical object is generated, and/or the 3D model is displayed.

The captured styling of a cell may also indicate a level of quality of an image or images captured at the perspective associated with the cell. For example, the captured styling may include displaying the cell in different colors for different quality levels. The level of quality may be associated with one of two possible values (e.g., acceptable quality or unacceptable quality) or one of many possible values and mapped to a corresponding appearance feature. For example, an acceptable level of quality may be indicated via a green coloring of the cell, while an unacceptable level of quality may be indicated via a red coloring of the cell. In this way, the user may identify and target the perspectives of images that may negatively affect the overall quality of a 3D model of the physical object. The level of quality may be determined based upon a resolution of the image(s), an amount of the perspective captured by the image(s), a level of focus of the image(s), and/or any other characteristic of the image(s) that affects the overall quality of the 3D model.

Figure 4:
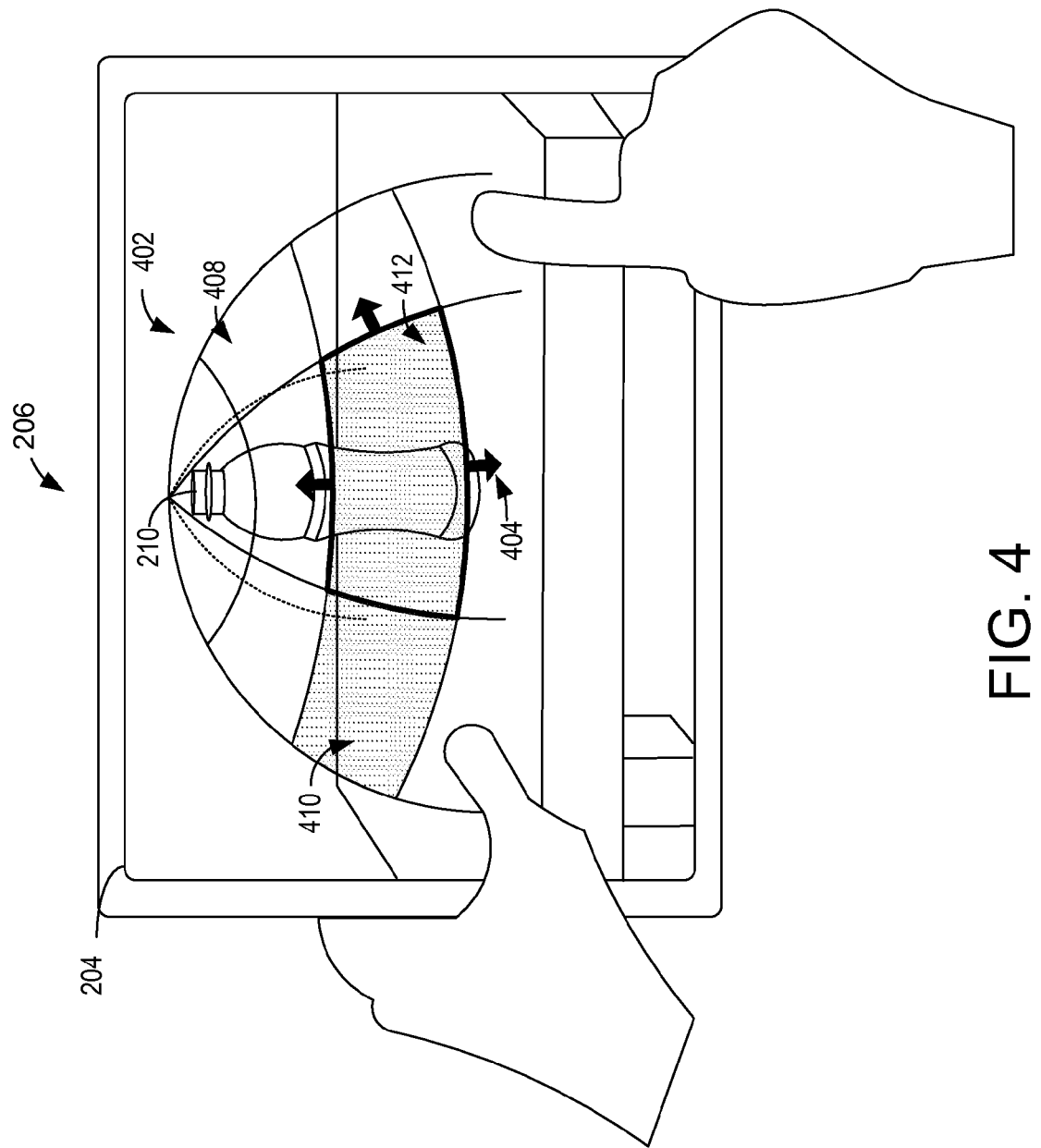

As illustrated in FIG. 4, a visual cue 402 may include a guide 404 indicating one or more directions for the camera 206 to move relative to the physical object to reach one or more non-imaged perspectives of the perspectives indicated by the cells 408. For example, after imaging previously captured cell 410 and current cell 412, the visual cue 402 may display the guide 404 including arrows directing the user to move toward a top of the physical object, the side of the physical object, and/or the bottom of the physical object. Thus, the arrows correspond to cells that are adjacent to the current cell 412 and remain uncaptured. In some embodiments, the arrows may also direct the user toward cells that are captured with a low level of quality. In such embodiments, arrows may have a different appearance based upon the level of quality and/or capture state of the cell to which each arrow points. For example, an arrow pointing to an uncaptured cell may be black, while an arrow pointing to a low quality captured cell may be red. It is to be understood that the guide may have any suitable appearance for indicating a direction of movement of the camera relative to the physical object to reach a perspective of the physical object associated with an uncaptured and/or low quality captured cell.

In some embodiments, the guide may be animated to indicate a movement that would result in capturing an image at a perspective associated with an uncaptured cell. For example, an image representing the camera 206 may be displayed as an animation moving around the representation of the physical object at the current view toward an uncaptured cell. In other examples, an incomplete and/or low quality 3D model of the physical object may be displayed and rotated to illustrate a perspective of the physical object that has yet to be imaged. Accordingly, the user may be given a hint relating to the relocation of the camera 206 to image an uncaptured region of the physical object. The guide 404 may indicate movements of the camera 206 relative to the physical object and/or a current location of the camera 206.

Figure 5:
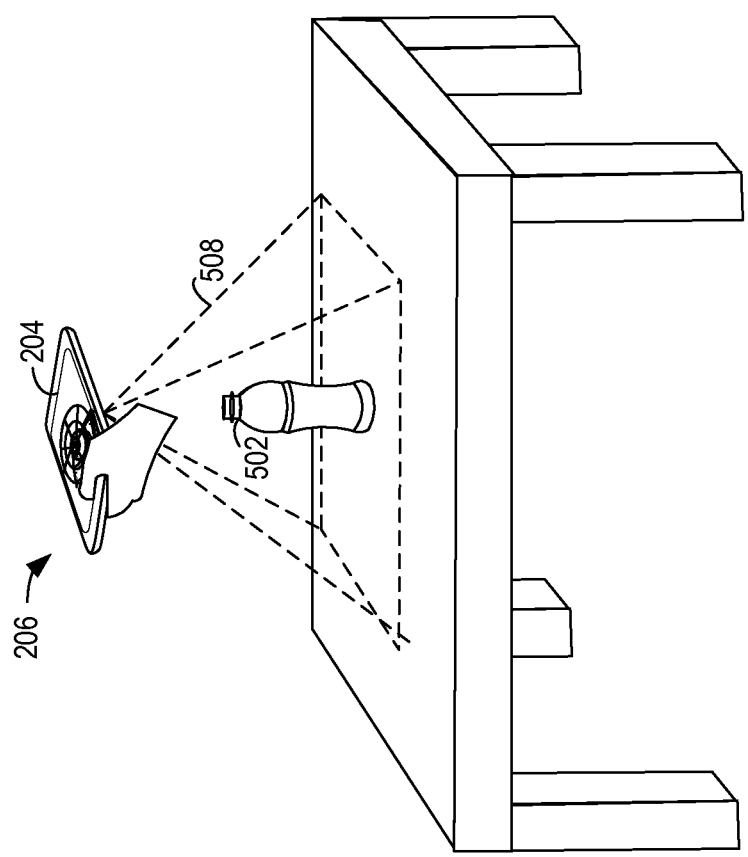
FIG. 5 shows an example positioning of a camera with respect to a physical object for imaging the physical object at a top perspective in accordance with an embodiment of the present disclosure.

FIG. 5 illustrates an example of a change in perspective of the camera 206 from a side view of a physical object, as illustrated in FIGS. 1-4, to a top view of the physical object. As shown in FIG. 5, the camera 206 is positioned above a physical object 502 and the field of view 508 of an imaging device of the camera 206 is positioned around the physical object 502. The current view and/or visual cue displayed on display 204 of the camera 206 may be updated in real time as the user moves to assist the user in aiming the device toward a particular perspective of the physical object 502.

Figure 6:
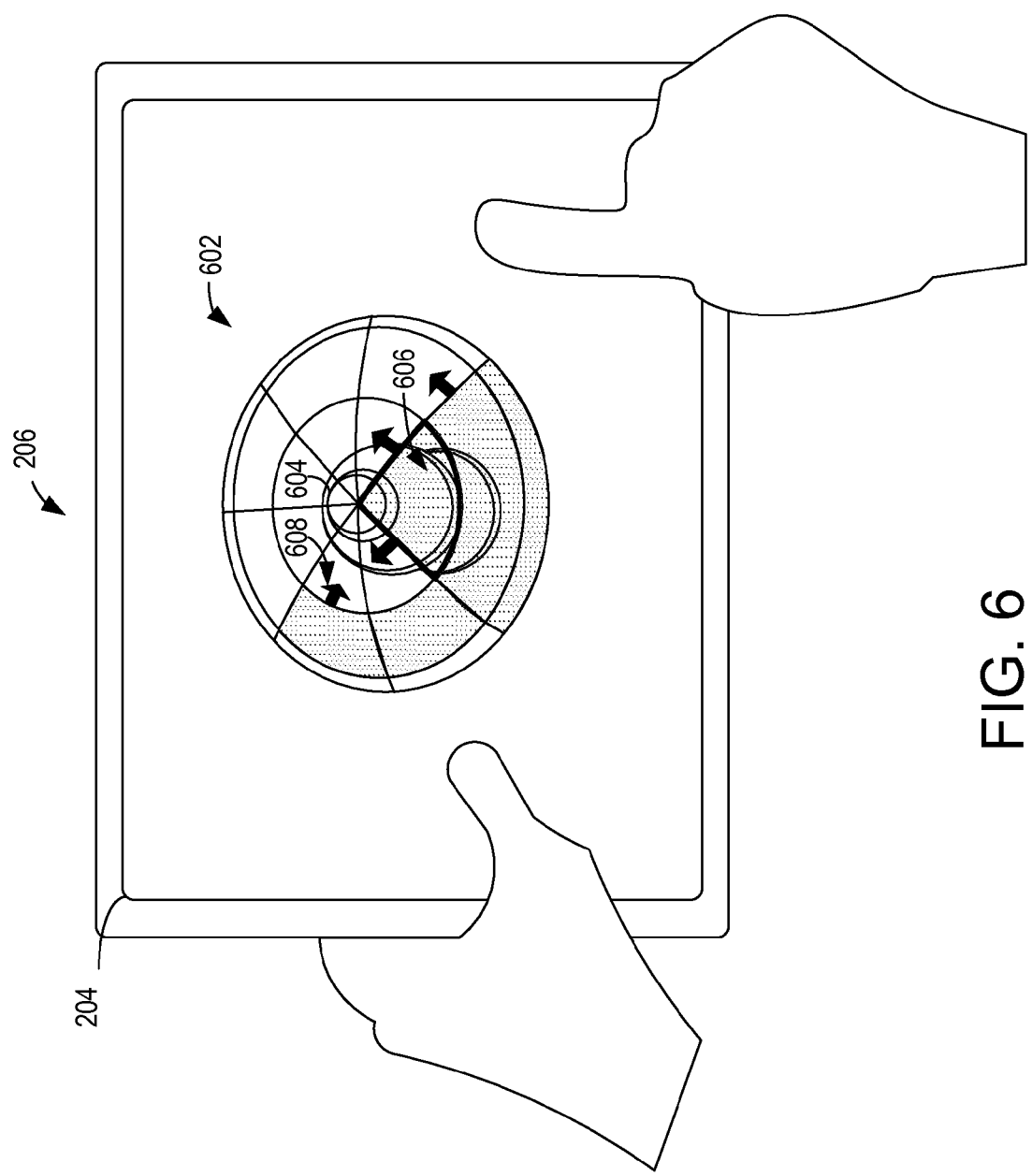
FIG. 6 shows an example visual cue for acquiring images at the perspective illustrated in FIG. 5 in accordance with an embodiment of the present disclosure.

Turning now to FIG. 6, the dynamically updated current view and visual cue 602 is shown as displayed on display 204 of camera 206 responsive to imaging the physical object at the position of the camera 206 shown in FIG. 5. The visual cue 602 may be tethered or otherwise logically attached to the physical object 502 represented from a top view at 604 such that the visual cue 602 is viewed at the same perspective as the physical object. For example, the visual cue 602 illustrated in FIG. 6 is displayed to show a top view of the hemisphere shown in FIGS. 1-4, thereby matching the top view perspective of the representation of the physical object displayed therein. The orientation of the visual cue may maintain consistency with the orientation of the camera, such that rotating the camera 180 degrees (e.g., flipping the camera upside down) results in the rotation of the visual cue 180 degrees (e.g., flipping the visual cue such that it appears to be upside down relative to the appearance illustrated in FIG. 6). Alternatively, the orientation of the visual cue with respect to the horizontal axis of the visual cue may remain static throughout movement of the camera.

In the visual cue 602 illustrated in FIG. 6, five perspectives of the physical object have been captured, the current perspective corresponding to the upper-most current cell 606, as indicated by the heavy outline of the cell. FIG. 6 also illustrates a guide 608 indicating directions of movement relative to captured cells for imaging at perspectives associated with uncaptured cells. As illustrated, arrows may indicate movement relative to the current cell 606, as well as movement from other captured cells to nearby uncaptured cells. In some embodiments, arrows or other directional elements may have any suitable configuration and/or placement to indicate movement toward a perspective associated with an uncaptured cell. In some embodiments, a guide may comprise a single arrow indicating a particular direction toward an uncaptured cell. The particular direction may correspond to a most efficient route for capturing images at each perspective for acquiring the set of images for the 3D modeling.

Figure 7:
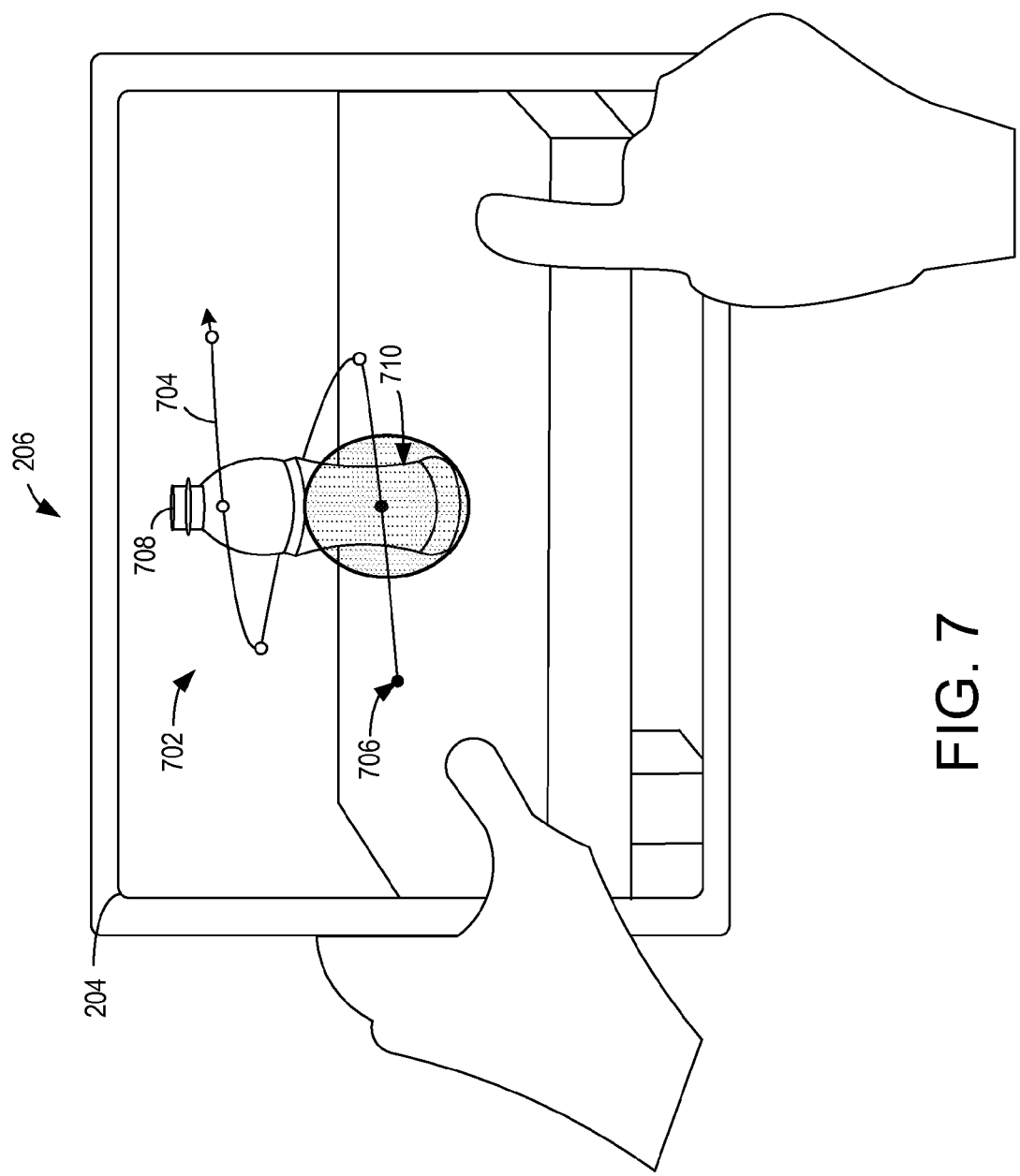
FIGS. 7-9 show example visual cues for acquiring a set of images for 3D modeling a physical object in accordance with embodiments of the present disclosure.

FIG. 7 illustrates an embodiment of a visual cue 702 that may be used as an addition or alternative to the visual cues 202, 402, and/or 602 shown in FIGS. 2-6 via the display 204 of the camera 206. In the example shown in FIG. 7, the visual cue 702 may include a path 704 with one or more waypoints 706 around the representation 708 of a physical object. The path may include a line or similar displayable feature that identifies a path of movement for a camera around a physical object. For example, the path 704 of FIG. 7 travels in an upward spiral pattern around the representation 708 of the physical object. The path 704 illustrates a motion of the camera 206 relative to the physical object that may be followed to reach each waypoint 706. In this way, the path 704 may guide the user through imaging each perspective of the physical object to acquire the set of images useable for 3D modeling the physical object.

The waypoints 706 may indicate a selected perspective from which the physical object is to be imaged. Upon reaching a perspective associated with a waypoint, an appearance of the visual cue 702 may be altered to illustrate a current waypoint 710 identifying the portion of the physical object that will be captured responsive to imaging at the current perspective. Furthermore, an appearance of a waypoint may be altered responsive to imaging the physical object from the selected perspective indicated by the waypoint. For example, a waypoint may be displayed with a particular color, size, position, animation, and/or any other suitable appearance feature responsive to imaging the physical object from the perspective associated with the waypoint. The appearance of the waypoint may also be altered to distinguish images having differing levels of quality, as discussed above with respect to FIG. 3.

Figure 8:
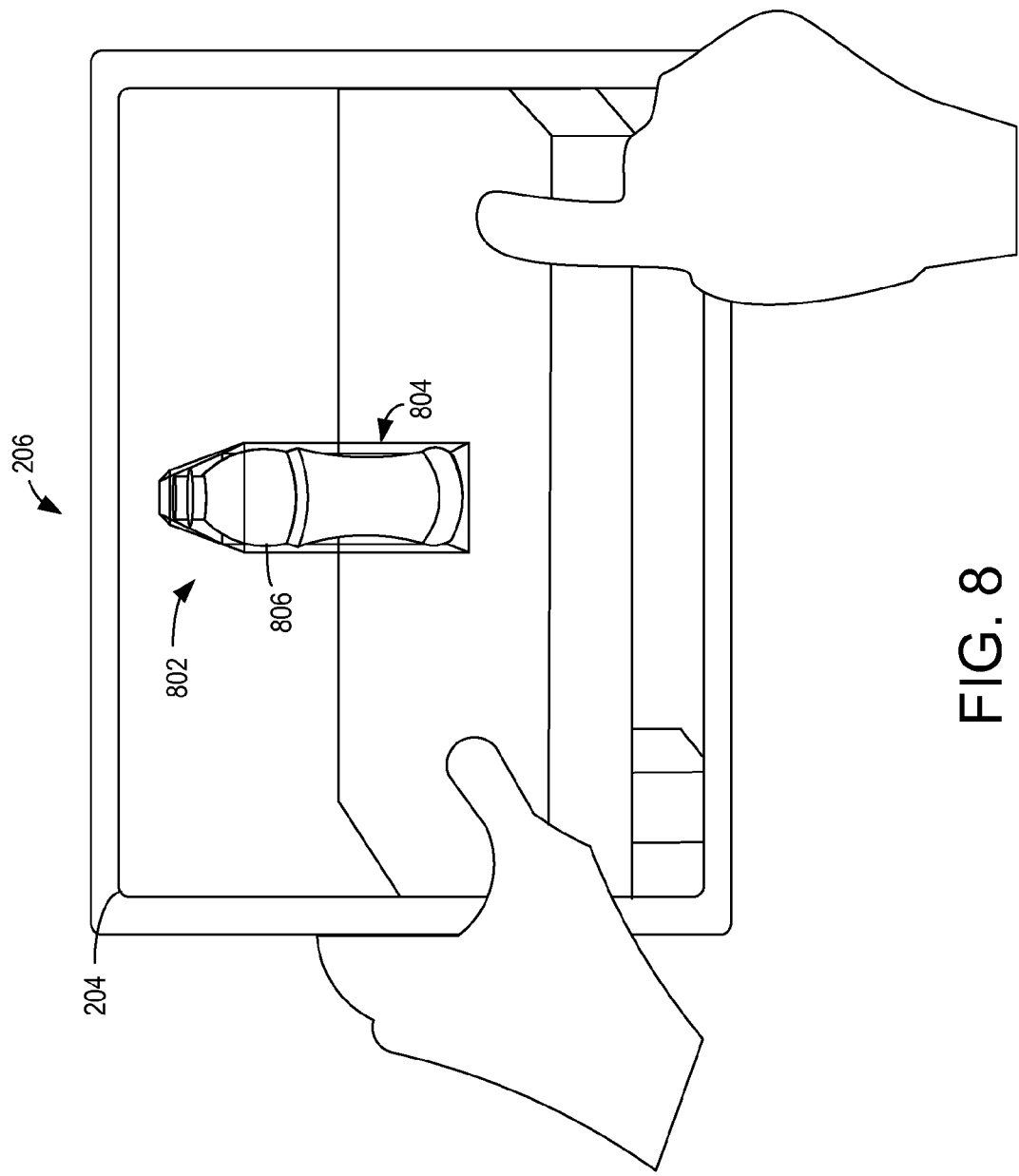

FIG. 8 shows an embodiment of a visual cue 802 for the display 204 of the camera 206 that presents a reference and/or low resolution model for a physical object to assist a user in acquiring a set of images for 3D modeling the physical object. The visual cue 802 may include one or more geometric shapes 804 modeling the physical object such that each face of the geometric shapes indicates a perspective from which the physical object is to be imaged. The perspective indicated by a particular face is a perspective in which an optical axis of the camera is substantially perpendicular to the face and passes through the face. The geometric shapes 804 may be generated locally or remotely based on one or more initializing images captured by the user. Further, the user may be guided through the process of capturing initializing images. For example, the user may capture a first image of the physical object from a first perspective. The camera 206 may generate and display a predefined cube around the location of the representation 806 of the physical object presented on the display 204 with one face of the cube displaying the first image. The camera 206 may control display of an indication of one or more additional faces of the cube to identify other perspectives relative to the first perspective from which one or more additional initializing images may be captured. The camera 206 may generate a low resolution model of the physical object via a combination of basic geometric blocks and/or shapes based on the initializing images. The user may provide input to align the geometric model with the physical object in order to ensure accurate image acquisition. For example, the user may identify a position, size, and or orientation of the one or more blocks of the geometric model. In some embodiments, the user may trace edges of the physical object (e.g., via touch input to the camera) as presented on the display at the current view in order to identify a low resolution model of the physical object. The user may then capture images of each geometric block face to generate a set of images usable to generate a final 3D model. In some embodiments, the low resolution model may be updated dynamically as each further image is captured and/or as each geometric block face is captured. In this way, the low resolution model may become more detailed and precise as more images are captured.

Figure 9:
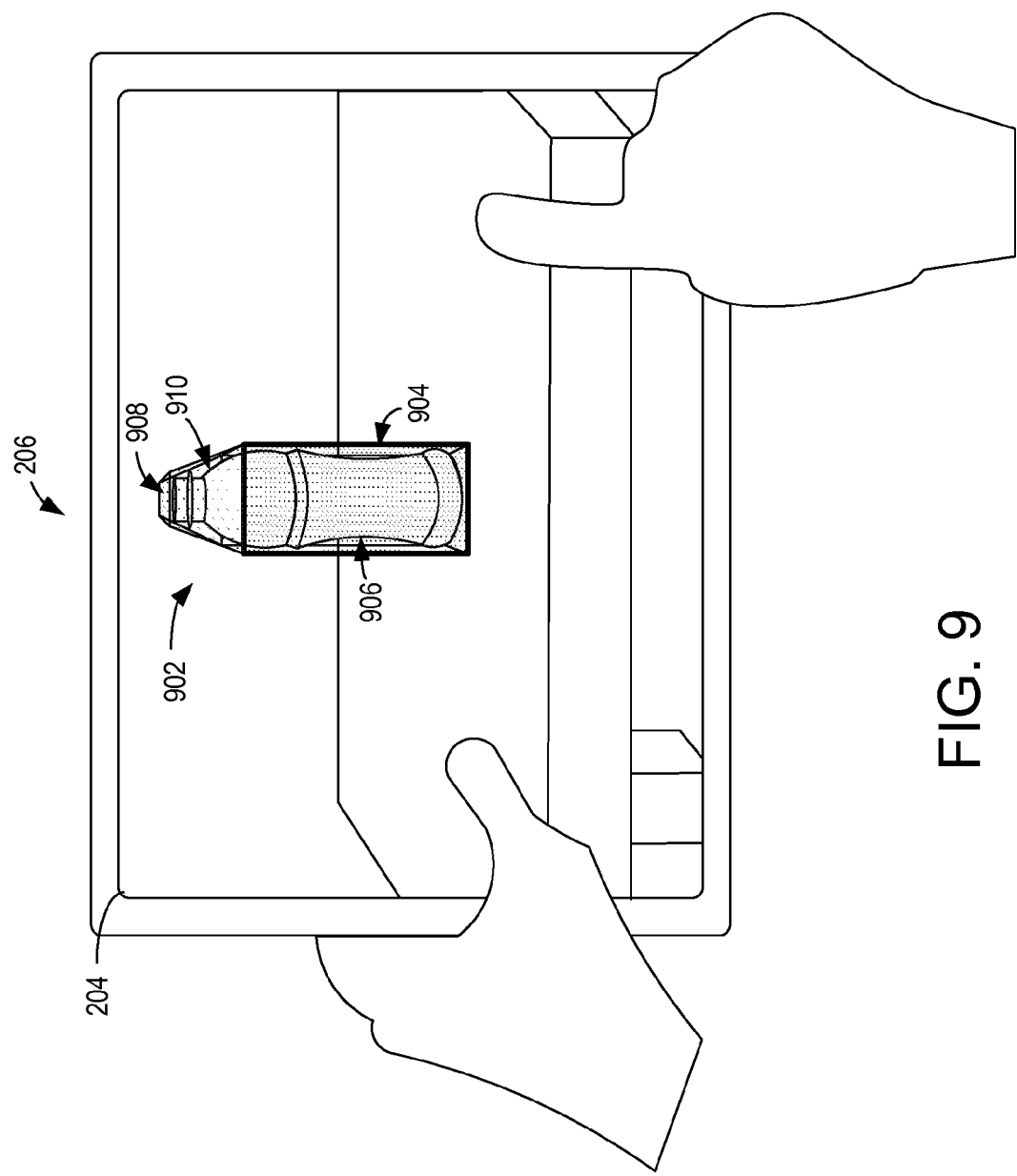

FIG. 9 shows an example of a visual cue 902 including multiple captured faces. The faces of the geometric blocks 904 may be displayed with an altered appearance similar to the cells 408 of FIGS. 2-6 responsive to capturing images at perspectives associated with the respective faces. In the example illustrated in FIG. 9, a currently viewed face 906 and a top face 908 may have a first appearance indicating that the associated perspectives are captured at an acceptable level of quality. The face 910 between the currently viewed and top faces is displayed with a different pattern, indicating a different and/or unacceptable level of quality of image(s) acquired at the perspective associated with the face 910. Thus, the user may be directed to recapture images at the perspective associated with the face 910 in order to increase the overall quality of a 3D model of the physical object.

Figure 10:
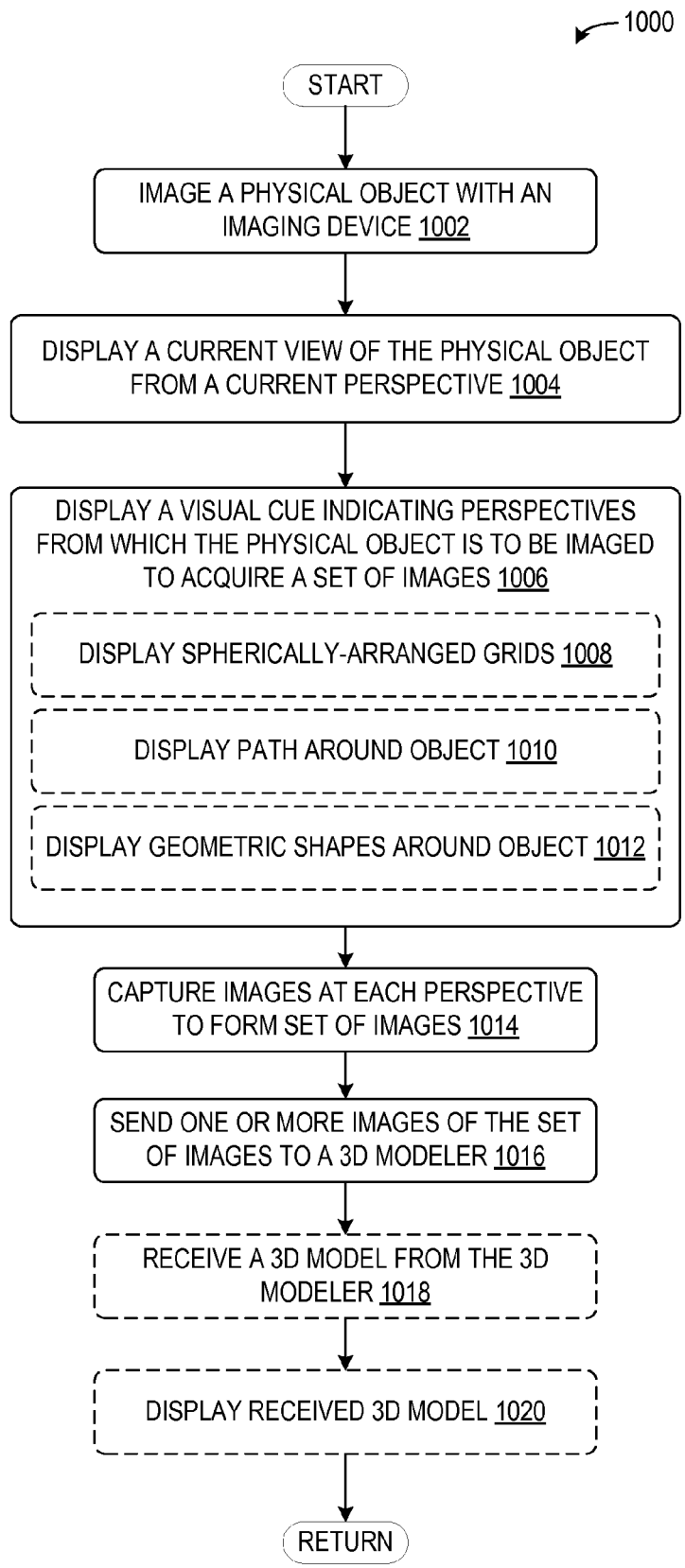
FIG. 10 is a flow chart of a method of acquiring a set of images for 3D modeling a physical object in accordance with embodiments of the present disclosure.

FIG. 10 is a flow chart of a method 1000 of acquiring a set of images usable to 3D model a physical object. For example, the method 1000 may be performed with the camera 106 of FIG. 1 to 3D model the targeted object 104 of FIG. 1. The method 1000 includes, at 1002, imaging a physical object with an imaging device. In some embodiments, imaging may include capturing one or more still images and/or a video stream at one or more perspectives of the physical object. The method 1000 further includes displaying a current view of the physical object as imaged by the imaging device from a current perspective at 1004. For example, the current view of the physical object may be displayed on a display device to indicate the appearance of the physical object from the current perspective.

At 1006, the method 1000 includes displaying a visual cue indicating perspectives from which the physical object is to be imaged to acquire a set of images. Displaying the visual cue may include displaying a plurality of spherically-arranged cells, as indicated at 1008 and illustrated in FIGS. 2-6. Additionally or alternatively, displaying the visual cue may include displaying a path around the physical object, as indicated at 1010 and illustrated in FIG. 7. In some embodiments, displaying the visual cue may include displaying geometric shapes around the physical object, as indicated at 1012 and illustrated in FIGS. 8-9. The visual cue may guide the user through capturing images at each perspective to form the set of images, as indicated at 1014. It is to be understood that the visual cues described in FIGS. 2-9 are exemplary, and a visual cue may take any suitable form for guiding a user through acquiring a set of images for 3D modeling a physical object.

The method 1000 further includes sending one or more images of the set of images to a 3D modeler at 1016. For example, images taken at one or more of the perspectives indicated by the visual cue may be sent to the 3D modeler 114 of FIG. 1. As another example, images taken at one or more of the perspectives indicated by the visual cue may be sent to an onboard 3D modeler of the camera. In response, the camera may optionally receive a 3D model from the 3D modeler, as indicated at 1018. The method 1000 optionally may further include displaying the received 3D model at 1020. For example, the 3D model may be displayed as an overlay or a standalone image on a display device of the camera. In some embodiments, the 3D model may be received and/or displayed at one or more other computing devices.

The display of a visual cue that identifies capture states of various perspectives of a physical object allows a user to quickly identify portions of the object that have not been imaged or have been imaged inadequately. Further, including a guide within the visual cue for indicating a direction of movement of a camera to reach an uncaptured perspective of the object assists a user in determining an efficient route to imaging each uncaptured perspective. Thus, the user may acquire images usable to generate a 3D model of an object through targeted image capturing that saves time and processing resources, as well as storage resources for excess images, in comparison to 3D model generation based upon unguided image acquisition.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
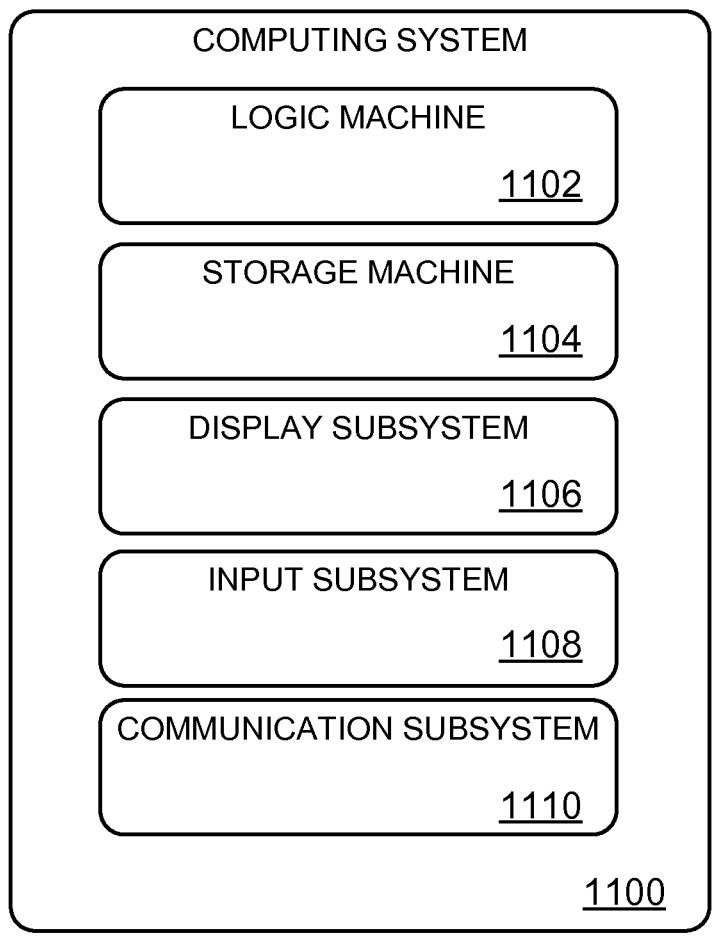
FIG. 11 is a block diagram of an example computing system in accordance with an embodiment of the present disclosure.

FIG. 11 schematically shows a non-limiting embodiment of a computing system 1100 that can enact one or more of the methods and processes described above. Computing system 1100 is shown in simplified form. Computing system 1100 may take the form of one or more cameras, personal computers, server computers, tablet computers, home-entertainment computers, network computing devices, gaming devices, mobile computing devices, mobile communication devices (e.g., smart phone), and/or other computing devices. For example, computing system 1100 may include or be included within camera 106 of FIG. 1.

Computing system 1100 includes a logic machine 1102 and a storage machine 1104. Computing system 1100 may optionally include a display subsystem 1106, input subsystem 1108, communication subsystem 1110, and/or other components not shown in FIG. 11.

Logic machine 1102 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1104 includes one or more physical devices configured to hold machine-readable instructions executable by the logic machine to implement the methods and processes described herein. When such methods and processes are implemented, the state of storage machine 1104 may be transformed—e.g., to hold different data.

Storage machine 1104 may include removable and/or built-in devices. Storage machine 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1104 may include volatile, nonvolatile, dynamic, static, read/write, read-only, random-access, sequential-access, location-addressable, file-addressable, and/or content-addressable devices.

It will be appreciated that storage machine 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1102 and storage machine 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1106 may be used to present a visual representation of data held by storage machine 1104. For example, the display subsystem 1106 may include and/or be included within display 110 of camera 106 of FIG. 1. This visual representation may take the form of a graphical user interface (GUI). As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology. Such display devices may be combined with logic machine 1102 and/or storage machine 1104 in a shared enclosure, or such display devices may be peripheral display devices.

When included, input subsystem 1108 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1110 may be configured to communicatively couple computing system 1100 with one or more other computing devices. For example, communication subsystem 1110 may communicatively connect the camera 106 to the remote computing device 112 via network 116 of FIG. 1. Communication subsystem 1110 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of acquiring a set of images useable to 3D model a physical object, the method comprising:
   imaging the physical object with a camera;
   displaying, with the camera, a current view of the physical object as imaged by the camera from a current perspective;
   displaying, with the camera, a visual cue overlaying the current view and indicating perspectives wrapping around the physical object from which the physical object is to be imaged to acquire the set of images, the visual cue comprising two or more cells forming a grid spherically arranged around the physical object, each cell indicating a perspective from which the physical object is to be imaged to acquire the set of images, an orientation of the visual cue being changeable to track an orientation of the camera as the physical object is imaged from different perspectives around the physical object, the visual cue visually indicating non-imaged perspectives from which the physical object has not already been imaged differently from perspectives from which the physical object has already been imaged in order to indicate movements of the camera to capture the non-imaged perspectives.

2. The method of claim 1, further comprising altering an appearance of a cell as the physical object is imaged from the perspective indicated by that cell.

3. The method of claim 1, wherein the visual cue is a path including one or more waypoints around the physical object, each of the one or more waypoints indicating a selected perspective around the physical object from which the physical object is to be imaged, at least a portion of the path being obscured by the current view of the physical object.

4. The method of claim 3, further comprising, for each of the one or more waypoints, altering an appearance of the waypoint responsive to imaging the physical object from the selected perspective indicated by the waypoint.

5. The method of claim 1, wherein the visual cue comprises one or more three-dimensional geometric shapes modeling the physical object, each face of the one or more three-dimensional geometric shapes indicating a different perspective around the physical object from which the physical object is to be imaged, the perspective indicated by each face of the one or more geometric shapes being a perspective in which an optical axis of the camera is perpendicular to that face and passes through that face.

6. The method of claim 1, wherein imaging the physical object with the camera comprises capturing video of the physical object at the perspectives indicated by the visual cue.

7. The method of claim 1, wherein the set of images comprises at least one image at each of the perspectives indicated by the visual cue.

8. The method of claim 1, further comprising:
   sending one or more images of the set of images to a 3D modeler; and
   receiving, from the 3D modeler, information for displaying the visual cue.

9. The method of claim 1, further comprising:
   sending one or more images of the set of images to a 3D modeler; and
   receiving the 3D model from the 3D modeler.

10. The method of claim 1, wherein the visual cue further comprises a guide indicating a direction for the camera to move relative to the physical object to reach a non-imaged perspective of the one or more perspectives.

11. The method of claim 1, further comprising displaying a cell in a targeted styling responsive to matching a current view to a perspective associated with the cell and displaying the cell in a captured styling responsive to capturing an image at the perspective associated with the cell.

12. The method of claim 11, further comprising displaying an arrow from a targeted cell associated with the current perspective, the arrow indicating a direction from the targeted cell to an uncaptured cell associated with an uncaptured perspective from which the physical object is to be imaged.

13. A system for acquiring a set of images usable to 3D model a physical object, the system comprising:
   an imaging device;
   a display device;
   a logic machine; and
   a storage machine holding instructions executable by the logic machine to:
      image the physical object with the imaging device;
      display, on the display device, a current view of the physical object as imaged by the imaging device from a current perspective;
      display, on the display device, a visual cue overlaying the current view and indicating different perspectives wrapping around the physical object from which the physical object is to be imaged to acquire the set of images, the visual cue comprising two or more cells forming a grid spherically arranged around the physical object, each cell indicating a perspective from which the physical object is to be imaged to acquire the set of images, an orientation of the visual cue being changeable to track an orientation of the imaging device as the physical object is imaged from different perspectives around the physical object, the visual cue indicating a capture state of the different perspectives from which the physical object is to be imaged by visually indicating non-imaged perspectives from which the physical object has not already been imaged differently from perspectives from which the physical object has already been imaged in order to indicate movements of the imaging device to capture the non-imaged perspectives.

14. The system of claim 13, further comprising altering an appearance of a portion of the visual cue as the physical object is imaged from one of the perspectives.

15. The system of claim 13, wherein the visual cue further comprises a guide indicating a direction for the imaging device to move relative to the physical object to reach a non-imaged perspective of the one or more perspectives.

16. The system of claim 13, further comprising an audio output device, the instructions further executable to provide audio feedback via the audio output device responsive to capturing an image at a perspective indicated by the visual cue.

17. A method of acquiring a set of images useable to 3D model a physical object, the method comprising:
   imaging the physical object with a camera;
   displaying with a display of the camera a current view of the physical object as imaged by the camera from a current perspective;
   displaying with the display of the camera a plurality of spherically-arranged cells wrapping 360 degrees around the physical object as displayed with the display of the camera, each cell indicating different perspectives around the physical object from which the physical object is to be imaged to acquire the set of images, the plurality of spherically-arranged cells visually indicating non-imaged perspectives from which the physical object has not already been imaged differently from perspectives from which the physical object has already been imaged in order to indicate movements of the camera to capture the non-imaged perspectives.

18. The method of claim 17, further comprising displaying a cell in a targeted styling responsive to matching a current view to a perspective associated with the cell and displaying the cell in a captured styling responsive to capturing an image at the perspective associated with the cell.

19. The method of claim 17, further comprising displaying an arrow from a targeted cell associated with the current perspective, the arrow indicating a direction from the targeted cell to an uncaptured cell associated with an uncaptured perspective from which the physical object is to be imaged.

* * * * *